(12) United States Patent
Lei

(10) Patent No.: US 12,123,978 B2
(45) Date of Patent: Oct. 22, 2024

(54) DISTANCE MEASUREMENT METHOD AND APPARATUS, AND DISTANCE MEASUREMENT SENSOR AND DISTANCE MEASUREMENT SENSING ARRAY

(71) Applicant: NINGBO ABAX SENSING CO., LTD., Ningbo (CN)

(72) Inventor: Shuyu Lei, Shaanxi (CN)

(73) Assignee: NINGBO ABAX SENSING CO., LTD., Ningbo (CN)

( * ) Notice: Subject to any disclaimer, the term of this patent is extended or adjusted under 35 U.S.C. 154(b) by 1042 days.

(21) Appl. No.: 17/047,915

(22) PCT Filed: Sep. 18, 2018

(86) PCT No.: PCT/CN2018/106148
§ 371 (c)(1),
(2) Date: Oct. 15, 2020

(87) PCT Pub. No.: WO2019/200833
PCT Pub. Date: Oct. 24, 2019

(65) Prior Publication Data
US 2021/0116549 A1    Apr. 22, 2021

(30) Foreign Application Priority Data
Apr. 16, 2018 (CN) .......................... 201810337272.9

(51) Int. Cl.
*G01C 3/08* (2006.01)
*G01S 7/4861* (2020.01)
*G01S 17/10* (2020.01)

(52) U.S. Cl.
CPC ............ *G01S 7/4861* (2013.01); *G01S 17/10* (2013.01)

(58) Field of Classification Search
CPC ......... G01S 7/4861; G01S 17/10; G01S 17/36
See application file for complete search history.

(56) References Cited

U.S. PATENT DOCUMENTS

2011/0279307 A1 * 11/2011 Song .................. G01S 13/282
                                                      342/134
2018/0259628 A1 *  9/2018 Plank ................. G01S 7/497

FOREIGN PATENT DOCUMENTS

EP           2315053 A2 *  4/2011 ........... G01S 7/4868

* cited by examiner

*Primary Examiner* — Mark Hellner
(74) *Attorney, Agent, or Firm* — Foley & Lardner LLP

(57) ABSTRACT

A distance measurement method, a distance measurement sensor, and a distance measurement sensing array, for use in improving the signal-to-noise ratio of a distance measurement system and increasing the distance measurement accuracy and a distance measurement distance. The method comprises: a receiving end obtains echo radiation, the echo radiation being from a reflecting action performed by an object to be measured on radiation, and the radiation being obtained by a transmitting end by modulating a modulating signal (S202) the receiving end performs at least one adjustment on the initial phase and/or pulse width of a demodulation signal or demodulating the echo radiation until the demodulation signal satisfies a preset condition, the preset condition comprising that an overlapping portion exists between the phase of the demodulation signal and the phase of the echo radiation (S203); the receiving end determines a distance between the transmitting end and the object to be measured according to the overlapping portion and the current phase of the demodulation signal (S204).

17 Claims, 6 Drawing Sheets

DISTANCE MEASUREMENT METHOD AND APPARATUS, AND DISTANCE MEASUREMENT SENSOR AND DISTANCE MEASUREMENT SENSING ARRAY

CROSS-REFERENCE TO RELATED APPLICATIONS

This application is a U.S. National Stage under 35 U.S.C. § 371 of International Patent Application No. PCT/CN2018/106148, filed on Sep. 18, 2018, which claims priority to Chinese patent application no. 201810337272.9, titled "TOF DISTANCE MEASUREMENT SENSOR, DISTANCE MEASUREMENT SENSING ARRAY, AND DISTANCE MEASUREMENT METHOD TOF BASED ON DISTANCE MEASUREMENT SENSOR" filed on Apr. 16, 2018, the entire content of each of which is incorporated in this application by reference.

TECHNICAL FIELD

The invention relates to the technical field of distance measurement, in particular to a distance measurement method, a distance measurement sensor and a distance measurement sensing array.

BACKGROUND

With the development of laser technology, embedded technology, and integrated optics, distance measurement apparatus such as sensors and distance measurement sensor arrays are developing in the direction of low cost, miniaturization, high reliability, and high safety. Traditional distance measurement apparatus, such as laser distance measurement radar detectors, usually uses single-point scanning or multi-line scanning. Both of these distance measurement methods require a mechanical scanning apparatus. Limited by the mechanical scanning apparatus, the traditional distance measurement apparatus has a slow scanning speed and low image spatial resolution.

At present, the transmitting end of the existing distance measurement apparatus sends a light signal to an object to be measured. The receiving end captures an echo signal formed by the reflection of the object to be measured, and determines the distance between the object to be measured and the distance measuring apparatus by calculating the return time of the optical signal. However, due to factors such as measured distance and radiated power, the echo signal energy captured by the receiving end of the existing distance measurement apparatus is relatively weak, and a plurality of distance measurement apparatus are likely to interfere with each other. Although the above-mentioned technical problems can be solved by increasing the photosensitive surface area of the receiving end or extending the integration time, both of these methods will reduce the accuracy of measured distance. In summary, it is urgent to design a distance measurement solution to solve the above problems.

SUMMARY

In the first aspect of the embodiment of the present invention. A distance measurement method is provided, which comprises the steps of: capturing an echo radiation by a receiving end, the echo radiation comes from the reflection of a radiation on an object to be measured, and the radiation is modulated on a transmitting end by using a modulating signal; adjusting the initial phase and/or pulse width by the receiving end for demodulating a demodulation signal of the echo radiation at least once, until the demodulation signal meets a preset condition, and the preset condition comprising that an overlapping portion exists between the phase of the demodulation signal and the phase of the echo radiation; determining the distance between the transmitting end and the object to be measured according to the overlapping portion and the current phase of the demodulation signal by the receiving end.

In an embodiment of the present invention, the preset condition further comprises that the pulse width of the demodulation signal meets a threshold, or the ratio between the pulse width of the demodulation signal satisfies a predetermined radiation ratio.

In an embodiment of the present invention, said step of adjusting the initial phase and/or pulse width by the receiving end for demodulating the demodulation signal of the echo radiation at least once further comprises: in the process of at least one adjustment of the demodulation signal, the process of each adjustment of the demodulation signal by the receiving end is as follows: determining the phase relationship between the echo radiation and the demodulation signal, and adjusting the initial phase and/or pulse width of the demodulation signal according to the phase relationship.

In an embodiment of the present invention, the demodulation signal comprises at least two sub-demodulation signals that are adjacent in phase, and the at least two sub-demodulation signals are used to receive the echo radiation; said step of determining the phase relationship between the echo radiation and the demodulation signal further comprises: correlating the echo radiation with the at least two sub-demodulation signals to obtain a correlation value; determining the phase relationship according to the correlation value.

In an embodiment of the present invention, the phase relationship includes one of the following: there is an overlap between the phase of echo radiation and the phase of at least one of the at least two sub-demodulation signals; there is no overlap between the phase of echo radiation and the phase of the at least two sub-demodulation signals.

In one embodiment of the invention, said step of adjusting the initial phase and pulse width of the demodulation signal according to the phase relationship further comprises: if there is an overlap between the phase of the echo radiation and the phase of the at least one sub-demodulation signal of the at least two sub-demodulation signals, then the sub-demodulation signal overlapping with the echo radiation the most is selected from the at least one sub-demodulation signal; adjusting the starting phase of said demodulation signal from the current starting phase of the demodulation signal to the starting phase of the selected sub-demodulation signal; and reducing the pulse width of the at least two sub-demodulation signals by a preset pulse width adjustment value, or reducing the pulse width of the at least two sub-demodulation signals according to a preset pulse width adjustment ratio.

In an embodiment of the present invention, said step of adjusting the initial phase of the demodulation signal according to the phase relationship comprises: if there is no overlap between the phase of the echo radiation and the phase of the at least two sub-demodulation signals, then the start phase of the demodulation signal is adjusted from the current start phase of the demodulation signal to the current cut-off phase of the demodulation signal, and keep the pulse width of at least two sub-demodulation signals unchanged.

In one embodiment of the invention, the step that the receiving end determines the distance between the transmitting end and the object to be measured according to the overlapping portion and the current phase of the demodulation signal comprises: determining the initial phase of the echo radiation based on the overlapping portion and the current phase of the demodulation signal; determining the distance between the transmitting end and the object to be measured based on the initial phase of the echo radiation.

In an embodiment of the present invention, the overlapping portion includes a partial phase of one sub-demodulation signal and entire phase of the other sub-demodulation signal among at least two sub-demodulation signals that are adjacent in phase. Determining the initial phase of the echo radiation based on the overlapping portion and the current phase of the demodulation signal includes: determining the phase difference between the partial phase of one sub-demodulation signal and the entire phase of the other sub-demodulation signal in the overlapping portion; determining the initial phase of the echo radiation based on the phase difference and the current initial phase of the demodulation signal.

In an embodiment of the present invention, the overlapping portion only includes entire phase of one sub-demodulation signal among at least two successively adjacent sub-demodulation signals. Determining the initial phase of the echo radiation based on the overlapped part and the current phase of the demodulation signal includes: determining the initial phase of the echo radiation based on entire phase of the sub-demodulation signal and the current initial phase of the demodulation signal.

In an embodiment of the present invention, the pulse width of each sub-demodulation signal in at least two sub-demodulation signals is the same.

In an embodiment of the present invention, the demodulation signal includes at least one ambient light demodulation signal for receiving ambient light radiation.

In an embodiment of the present invention, the step that the receiving end determines the distance between the transmitting end and the object to be measured based on the overlap portion and the current phase of the demodulation signal further includes: removing the ambient light radiation included in the demodulation signal based on the at least one ambient light demodulation signal.

In an embodiment of the present invention, the pulse width of the at least two sub-demodulation signals is the same as the pulse width of the ambient light demodulation signal corresponding to the at least two sub-demodulation signals.

In an embodiment of the present invention, at least one reset signal is formed, and the phase of the at least one reset signal does not overlap with the phase of the demodulation signal.

In an embodiment of the present invention, the preset pulse width adjustment ratio is, N is a positive integer.

In an embodiment of the present invention, the demodulation signal is obtained by modulation of a modulating signal, wherein the modulating signal includes a pseudo-random code.

In the second aspect of the embodiments of the present invention, a distance measuring apparatus is provided, which includes a transmitting end and a receiving end, wherein the transmitting end is used to modulate radiation with a preset modulating signal, and send radiation to the object to be measured. The receiving end is used to capture echo radiation, which comes from the reflection of the radiation on the object to be measured; adjusting the initial phase and/or pulse width of the demodulation signal used to demodulate the echo radiation at least once until the demodulation signal meets the preset condition; the preset condition comprises that an overlapping portion exists between the phase of the demodulation signal and the phase of the echo radiation; determining the distance between the transmitting end and the object to be measured based on the overlap and echo radiation, wherein the receiving end is also used to execute the method provided in any one of the first aspect.

In an embodiment of the present invention, the modulating signal used for the modulation and demodulation signal is the same as the modulating signal used for the modulated radiation, wherein the modulating signal includes a pseudo-random code.

In an embodiment of the invention, the modulating signal includes at least two different states.

In a third aspect of the embodiment of the present invention, an apparatus is provided, which includes: a capturing unit, configured to capture echo radiation, the echo radiation coming from the reflection effect of the object to be measured on the radiation, and the radiation is obtained by modulating the transmitting end with a modulating signal; an adjusting unit, configured to adjust the initial phase and/or pulse width of the demodulation signal used to demodulate the echo radiation at least once, until the demodulation signal meets a preset condition, and the preset condition comprising that an overlapping portion exists between the phase of the demodulation signal and the phase of the echo radiation; a determining unit, configured to determine the distance between the transmitting end and the object to be measured according to the overlapping portion and the current phase of the demodulation signal.

In an embodiment of the present invention, the preset condition further comprises that the pulse width of the demodulation signal meets the threshold, or the ratio between the pulse width of the demodulation signal and the pulse width of echo radiation meets the preset ratio.

In an embodiment of the present invention, the adjusting unit is configured to: during at least one adjustment of the demodulation signal, the process of each adjustment of the demodulation signal is as follows: determining the phase relationship between the echo radiation and the demodulation signal, and adjusting the initial phase and/or pulse width of the demodulation signal according to the phase relationship.

In an embodiment of the present invention, the demodulation signal includes at least two sub-demodulation signals that are adjacent in phase, and the at least two sub-demodulation signals are used to receive echo radiation. When determining the phase relationship between the echo radiation and the demodulation signal, the adjusting unit is configured to: correlate the echo radiation with at least two sub-demodulation signals to obtain a correlation value; and determine the phase relationship according to the correlation value.

In an embodiment of the present invention, the phase relationship includes one of the following: the phase of echo radiation overlaps with the phase of at least one of the at least two sub-demodulation signals; there is no overlap in the phases of the sub-demodulation signals.

In one embodiment of the invention, when adjusting the initial phase and pulse width of the demodulation signal according to the phase relationship, the adjusting unit is used for: if there is an overlap between the phase of the echo radiation and the phase of at least one of the at least two sub-demodulation signals, then selecting the sub-demodulation signal that overlaps with the echo radiation the most from the at least one sub-demodulation signal, adjusting the initial phase of the demodulation signal from the current initial phase of the demodulation signal to the initial phase of the selected sub-demodulation signal, and reducing the pulse widths of at least two sub-demodulation signals by a preset pulse width adjustment value, or reducing the pulse widths of at least two sub-demodulation signals according to a preset pulse width adjustment ratio.

In an embodiment of the present invention, the adjusting unit adjusting the initial phase of the demodulation signal according to the phase relationship is used for: if there is no overlap between the phase of the echo radiation and the phase of the at least two sub-demodulation signals, the initial phase of the demodulation signal is adjusted from the current initial phase of the demodulation signal to the current cut-off phase of the demodulation signal, and keeping the pulse width of at least two sub-demodulation signals unchanged.

In an embodiment of the present invention, the determining unit is used for: determining the initial phase of the echo radiation based on the overlapping portion and the current phase of the demodulation signal; determining the distance between the transmitting end and the object to be measured based on the initial phase of the echo radiation.

In an embodiment of the present invention, the overlapping portion includes a partial phase of one sub-demodulation signal and one entire phase of the other sub-demodulation signal among at least two sub-demodulation signals that are adjacent in phase. When the determining unit determines the initial phase of the echo radiation based on the overlapping portion and the current phase of the demodulation signal, it is specifically used to determine the phase difference between the partial phase of one sub-demodulation signal and the entire phase of the other sub-demodulation signal in the overlapping portion and determining the initial phase of echo radiation according to the phase difference and the current phase of the demodulation signal.

In an embodiment of the present invention, the overlapping portion only includes entire phase of one sub-demodulation signal among at least two successively adjacent sub-demodulation signals. When determining the initial phase of echo radiation based on the overlapped part and the current phase of the demodulation signal, the determining unit is specifically used for determining the initial phase of the echo radiation, based on entire phase of the sub-demodulation signal and the current initial phase of the demodulation signal.

In an embodiment of the present invention, the pulse width of each sub-demodulation signal in at least two sub-demodulation signals is the same.

In an embodiment of the present invention, the demodulation signal includes at least one ambient light demodulation signal for receiving ambient light radiation.

In an embodiment of the present invention, an interference cancellation unit is further included for removing ambient light radiation in the demodulation signal based on at least one ambient light demodulation signal before the determining unit determines the distance between the transmitting end and the object to be measured according to the overlapping portion and the current phase of the demodulation signal.

In an embodiment of the present invention, the pulse width of the at least two sub-demodulation signals is the same as the pulse width of the ambient light demodulation signal corresponding to the at least two sub-demodulation signals.

In an embodiment of the present invention, a reset unit is further included to form at least one reset signal, and the phase of the at least one reset signal does not overlap with the phase of the demodulation signal.

In an embodiment of the present invention, the preset pulse width adjustment ratio is N, which is a positive integer.

In an embodiment of the present invention, the demodulation signal is obtained by modulation of a modulating signal, wherein the modulating signal includes a pseudo-random code.

In a fourth aspect of the embodiment of the present invention, a sensor is provided which comprising: a transmitting end, used to modulate radiation with a preset modulating signal, and send radiation to an object to be measured; a receiving end is used to capture echo radiation, which comes from the reflection of the radiation on the object to be measured; adjusting the initial phase and/or pulse width of the demodulation signal used to demodulate the echo radiation at least once until the demodulation signal meets a preset condition, the preset condition comprises that an overlapping portion exists between the phase of the demodulation signal and the phase of the echo radiation; determining the distance between the transmitting end and the object to be measured based on the overlap and echo radiation. Wherein, the receiving end is used to execute any one of the methods according to the first aspect.

In a fifth aspect of the embodiments of the present invention, a sensor array is provided, and the sensor array includes a plurality of sensors. The plurality of sensors may be a plurality of sensors as in any one of the fourth aspect. Alternatively, the plurality of sensors may also be a plurality of CMOS sensors similar to any one of the sensors in the fourth aspect. Wherein, the receiving end of the sensor is used to execute any one of the methods according to the first aspect.

In the technical solution provided by the embodiment of the present invention, the receiving end adjusts the starting position and pulse width of the demodulation signal at least once, and determines the distance between the transmitting end and the object to be measured according to the overlapping portion and the current phase of the demodulation signal until the demodulation signal meets the preset conditions. The embodiment of the present invention captures echo radiation by using demodulation signals that meet preset conditions, which helps reduce the influence of noise and background light on the demodulation process of echo radiation, and improves the signal-to-noise ratio of the distance measuring system; adjusting the initial phase of the signal also helps to improve the signal-to-noise ratio of the echo signal collected at the receiving end, avoiding mutual interference between a plurality of distance measuring apparatuses, and improving distance measuring accuracy and measuring range.

The meaning of each label in the figures are: 1—electronic apparatus; 2—radiation source; 3—receiving apparatus; 4—correlating apparatus; 5—judgment correction apparatus; 6—circulating apparatus; 7—calculating apparatus; 10—Metal shielding layer; 21—Gate; 22—Suspended diffusion node; 23—Reset; 24—N-type heavily doped region; 25—P-type heavily doped region; 30—clamped P-type heavily doped semiconductor; 40—Deep N-type heavily doped semiconductor; 50—P-type low-doped semiconductor outer edge layer; 51—P-type low-doped semiconductor substrate;

101—modulating signal; 201—radiation; 401—echo radiation; 501~504—demodulation signal

DETAILED DESCRIPTION

The technical solutions in the embodiments of the present invention will be clearly and completely described below in conjunction with the accompanying drawings in the embodiments of the present invention. Obviously, the described embodiments are only a part of the embodiments of the present invention, not all the embodiments. Based on the embodiments of the present invention, all other embodiments obtained by those of ordinary skill in the art without creative work shall fall within the protection scope of the present invention.

In the existing distance measuring apparatus, limited by factors such as measured distance and radiated power, the echo signal energy collected by the receiving end of the existing distance measuring apparatus is weak, and a plurality of distance measuring apparatuses are likely to interfere with each other. Although the method of increasing the photosensitive surface area of the receiving end or extending the integrating time is helpful to solve the above technical problems, it will cause the distance measuring accuracy of the distance measuring apparatus to decrease.

In order to improve the weak energy of the echo signal collected at the receiving end due to long distance, reduce the signal interference between a plurality of distance measuring apparatuses and improve the distance measuring accuracy of the distance measuring apparatus. The embodiments of the present invention provide a distance measurement method, a sensor, and a distance measurement sensor array. Among them, the distance measuring method, sensor, and distance measuring sensor array are based on the same inventive concept, because the distance measuring method, sensor, and distance measuring sensor array have similar principles for solving problems. Therefore, the implementation of the distance measuring method, the sensor and the distance measuring sensor array can be referred to each other, and the same content will not be repeated.

Figure 1:
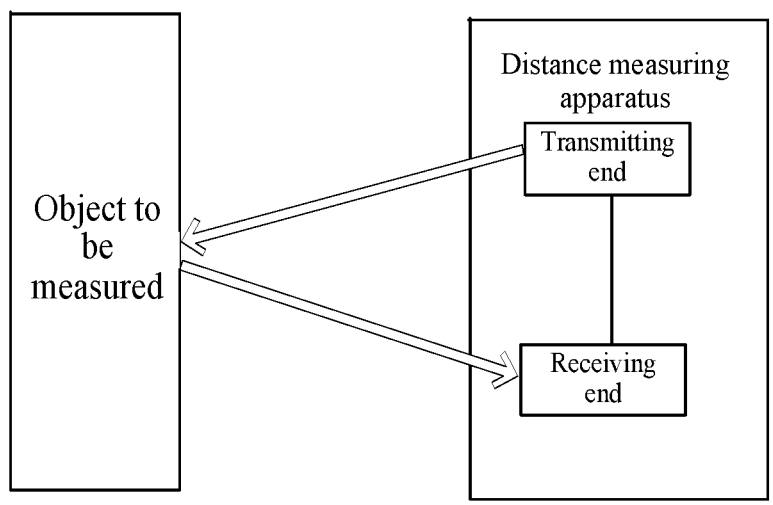
FIG. 1 schematically shows a schematic structural diagram of a distance measuring scenario applicable to an embodiment of the present invention.

The technical solutions provided by the embodiments of the present invention are suitable for any distance measuring scenarios, especially long-distance high-precision distance measuring scenarios. For example, the scene of long-distance high-precision distance measuring of obstacles during automatic driving. Take the schematic diagram of a network architecture shown in FIG. 1 as an example, FIG. 1 involves a distance measuring apparatus and objects to be measured. FIG. 1 shows only one distance measuring apparatus, and there may be a plurality of distance measuring apparatus. A transmitting end and a receiving end may be set in the same distance measuring apparatus, or may be set in different distance measuring apparatuses, which is not limited in the embodiment of the present invention. After the transmitting end projects the light signal to the object to be measured, the receiving end collects the echo signal reflected by the object to be measured. By calculating the return time of the optical signal to determine the distance between the object to be measured and the distance measuring apparatus. The technical solutions provided by the embodiments of the present invention are particularly suitable for long-distance and high-precision distance measuring scenarios. In this scenario, due to the long distance between the distance measuring apparatus and the object to be measured in FIG. 1, the energy of the echo signal collected by the receiving end of the distance measuring apparatus is relatively weak due to the limitation of radiation power. In addition, the ambient light radiation and other radiation received by the receiving end of the distance measuring apparatus may cause interference to the echo signal, which may cause the failure of the distance measuring or the decrease of accuracy.

The technical solutions provided by the embodiments of the present invention can be applied to a variety of systems, especially systems that require high distance measuring accuracy or long distance. For example, applicable systems can be autopilot systems, surveying and mapping systems, drone tracking systems, machine vision systems, gaming systems, artificial intelligence systems, and so on.

The technical solution provided by the embodiment of the present invention involves the object to be measured and the distance measuring apparatus. The object to be measured in the embodiment of the present invention may be a person, an animal, a moving object or a fixed object, which is not limited here. The distance measuring apparatus involved in the embodiment of the present invention includes a transmitting end and a receiving end. The transmitting end uses a preset modulating signal to modulate the radiation, and then sends the radiation to the object to be measured. The receiving end captures the echo radiation reflected by the object to be measured, adjusting the initial phase and/or pulse width of the demodulation signal used to demodulate the echo radiation at least once until the demodulation signal meets the preset condition. The preset condition comprises that an overlapping portion exists between the phase of the demodulation signal and the phase of the echo radiation. The receiving end determines the distance between the transmitting end and the object to be measured according to the overlapping portion and the echo radiation. Optionally, the modulating signal used to modulate the demodulation signal at the receiving end is the same as the modulating signal used to modulate the radiation at the transmitting end, and the modulating signal includes but is not limited to pseudo-random coding.

In different systems, the objects to be measured may be different objects, and the distance measuring equipment may also be different systems (or equipment). In the embodiment of the present invention, the distance measuring apparatus may be a lidar apparatus, and the lidar apparatus may also be called by other names, such as a laser distance measuring radar detector. With the improvement of lidar equipment technology, the application cases of lidar equipment for long-distance high-precision distance measuring in a variety of scenarios are growing very rapidly. For example, the long-distance high-precision distance measuring of obstacles in the autonomous driving scene, and the long-distance high-precision distance measuring of the tracked object in the scene of UAV wild animal tracking. In industrial production, high-precision distance measuring is used to guide the work of industrial robotic arms and other application cases.

The terms involved in the embodiments of the present invention are explained below.

Correlation is usually the convolution of two signals in one cycle or several cycles.

Pseudo-random sequence is a definite sequence with basic characteristics similar to random sequence. It is widely used in binary sequence with 0 and 1 elements. Pseudo-random sequences include, but are not limited to, m sequences, Gold sequences, GMW sequences, and Bent sequences. Commonly used pseudo-random codes are m sequence codes and Gold codes. Among all pseudo-random sequences, m-sequence is the most important and basic pseudo-random sequence. It is easy to generate, has strong regularity, has good self-correlation and good cross-correlation characteristics. The m sequence is short for the longest linear feedback shift register sequence. It is the longest code sequence generated by a multi-stage shift register or other delay unit through linear feedback. If the number of stages is n, the maximum length of the code sequence generated is 2n−1. The Gold code sequence is a code sequence based on the m sequence. It has excellent auto-correlation and cross-correlation characteristics, and produces a large number of sequences. The self-correlation of the Gold code is not as good as the m-sequence, and the cross-correlation of the Gold code is better than the m-sequence, but it has not yet reached the best. The n-stage shift register can generate 2n+1 Gold sequences, and can also be a multivariate pseudo-random sequence, such as: p-element m-sequence (p is a prime number), p-element Gold sequence, p-element GMW sequence, generalized Bent sequence, etc.

Pulse width refers to the width of the signal pulse. If the signal is a square wave signal, the pulse width is the time width of the square wave signal when the value is 1. If the signal is a sinusoidal signal, the pulse width is the time width when the amplitude of the sinusoidal signal is greater than 0. If the signal is a triangle wave signal, it is the same as a sinusoidal signal. In the embodiment of the present invention, the demodulation signal, radiation, and modulating signal may have different pulse widths or the same pulse width, and the pulse widths of the radiation and modulating signals may remain unchanged.

The term "phase shift" refers to signals having a time offset distribution relative to each other.

The various embodiments of the present invention will be described in detail below in conjunction with the accompanying drawings of the specification. It should be noted that the display order of the embodiments of the present invention only represents the sequence of the embodiments, and does not represent the pros and cons of the technical solutions provided by the embodiments.

Figure 2:
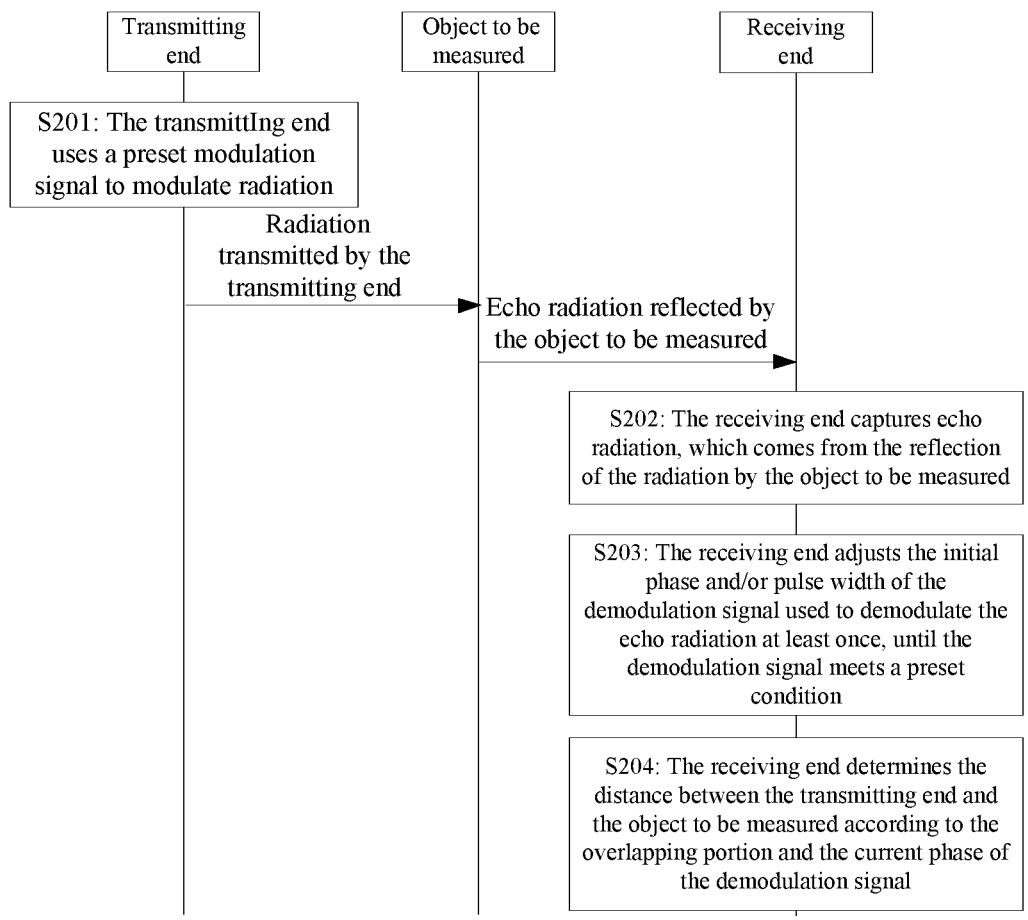
FIG. 2 schematically shows a flow chart of a distance measuring method provided by an embodiment of the present invention.

The embodiment of the present invention provides a distance measuring method. The method involves the object to be measured, the receiving end of the distance measuring apparatus, and the transmitting end of the distance measuring apparatus. The receiving end and the transmitting end can be set in the same distance measuring apparatus or in different distance measuring apparatuses. The positional relationship between the receiving end and the transmitting end needs to be preset or determined in advance. FIG. 2 shows a schematic flow chart of a distance measuring method. The interaction process between the receiving end and the transmitting end in this method is as follows:

S201: The transmitting end modulates radiation using a preset modulating signal, and sends the radiation to the object to be measured.

The transmitting end can be a semiconductor radiation source, such as a light emitting diode (LED) or a laser diode (LD); the radiation can be visible or invisible light, such as IR (infrared), VIS (visible light) or UV radiation (ultraviolet). Depending on the type of transmitting end, the type of radiation is also different. Optionally, the radiation can be monochromatic light, that is, use a full width at half maximum of less than 10%, more particularly a full width at half maximum of less than 5%, and more particularly a full width at half maximum of less than 2%, more specifically, of a full width at half maximum of less than 1%, more specifically of a full width at half maximum of less than 0.1%.

The modulating signal can be one signal or a signal group composed of a plurality of signals. The waveform of the modulating signal can be a combination of linear wave forms and/or nonlinear wave forms, or a single waveform. The waveform of the modulating signal includes, but is not limited to, a triangular shape, a trapezoidal shape, a rectangular shape, and a saw tooth shape with vertical sides. Optionally, the demodulation signal may have a waveform that periodically alternates above and below the threshold, such as a sine signal or a square wave signal. If the waveform of the modulating signal has a non-rectangular distribution, a small error or a calculating apparatus can be used in subsequent calculations to supplement it through a correction function or a correction table. Optionally, the modulating signal modulating the radiation includes at least two different states. Taking the waveform of the modulating signal as a square wave as an example, the at least two different states include 1 and 0. Optionally, the modulating signal has a pulse width of 1.2 microseconds. If the radiation has a wavelength of 905 nm and a pulse width of 100 ns, the echo radiation is a rectangular signal with a pulse width of 100 ns, and the echo radiation is phase shifted with respect to the radiation. The phase shift between the transmitted and received rectangular signals corresponds to twice the distance between the TOF distance sensor and the object.

For example, the modulating signal is a 14-level pseudo-random code sequence, and the 14-level pseudo-random code sequence has 16,384 states, in which 0 state and 1 state each account for half of the entire pseudo-random code sequence. To ensure that the channel where the radiation sent by the transmitting end is located does not interfere with other channels to prevent crosstalk. In addition, the number of consecutive is in the pseudo-random code sequence cannot exceed 14. When the pseudo-random code sequence is 1, the radiation at the transmitting end is modulated by a rising edge trigger.

The transmitting end sends radiation periodically or continuously. Preferably, the transmitting end can also pause the preset time period so as to complete the distance measuring calculation within the preset time period. Reduce the transmitting power of the transmitting end and save the power consumption of the transmitting end. For example, the radiation emission period may be 20 ms, the pulse width of the modulating signal is 1.2 μs, and the pulse width of the radiation is 100 ns.

S202: The receiving end captures echo radiation, which comes from the reflection of the radiation by the object to be measured.

In this embodiment, there may be one or more receiving ends. When there are a plurality of receiving ends, the method of interaction between the transmitting end and each receiving end is the method shown in FIG. 2. The receiving end includes, but is not limited to, photo diodes, CMOS image sensors, and CCD image sensors.

S203: The receiving end adjusts the initial phase and/or pulse width of the demodulation signal used to demodulate the echo radiation at least once, until the demodulation signal meets a preset condition. The preset condition comprises that an overlapping portion exists between the phase of the demodulation signal and the phase of the echo radiation.

In the embodiment of the present invention, the waveform of the demodulation signal at the receiving end and the waveform of the modulating signal at the transmitting end may be different. The starting phase of the demodulation signal may refer to the starting time domain position of the demodulation signal. Optionally, the modulating signal used for the modulation and demodulation signal includes but is not limited to pseudo-random coding. There is an overlap between the phase of the demodulation signal and the phase of the echo radiation, that is, the time domain position of the demodulation signal and the time domain position of the echo radiation are partially or completely the same. The demodulation signal can be one signal, or the demodulation signal can be a signal group composed of a plurality of signals. When the demodulation signal is a demodulation signal group composed of a plurality of signals, the overlap between the phase of the demodulation signal group and the phase of the echo radiation includes one of the following: the phase of the echo radiation overlaps with the phase of at least one demodulation signal in the demodulation signal group; the phase of the echo radiation overlaps with the phases of all demodulation signals in the demodulation signal group. Optionally, the demodulation signal includes at least two sub-demodulation signals that are adjacent in phase, and the at least two sub-demodulation signals are used to receive echo radiation. The adjacent phases mean that the falling edge of the previous sub-demodulation signal is the rising edge of the next sub-demodulation signal. It should be noted that the demodulation signal at the receiving end is similar to the modulating signal at the transmitting end. For details, please refer to the relevant description of the modulating signal in S201 above, which will not be repeated here.

Figure 3:
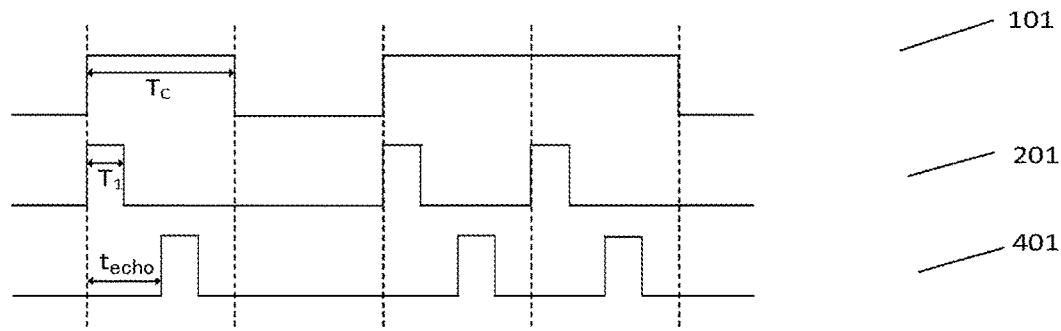
FIG. 3 schematically shows a diagram of a radiation timing and an echo radiation timing provided by an embodiment of the present invention.

As shown in the timing diagram of radiation and echo radiation as shown in FIG. 3, the modulating signal 101, the radiation 201 sent by the transmitting end, and the echo radiation 401 received by the receiving end are all rectangular signals. These three signals have two states, namely 0 and 1. In a possible implementation, the radiation 201 and the modulating signal 101 can be emitted at the same time. The pulse width of the modulating signal 101 is $T_c$, and the pulse width of the emitted radiation 201 is $T_1$, and there is a certain phase relationship between the modulating signal 101 and the radiation 201. The modulating signal 101 modulates the radiation 201 by means of a rising edge trigger. The phase shift between the echo radiation 401 and the radiation 201 received by the receiving end after the radiation 201 is reflected by the object to be measured is $t_{echo}$. According to the phase shift $t_{echo}$, the distance between the transmitting end and the object to be measured can be determined, and the positional relationship between the transmitting end and the receiving end is a preset positional relationship.

In the embodiment of the present invention, preferably, the preset condition further comprises that the pulse width of the demodulation signal satisfies the threshold, or the ratio between the pulse width of the demodulation signal and the pulse width of echo radiation satisfies the preset ratio. For example, the pulse width of the demodulation signal is less than or equal to the pulse width of echo radiation. Preferably, the ratio between the pulse width of the demodulation signal and the pulse width of the echo radiation satisfies 1/M, where M is a positive integer.

In a possible implementation of S203: in each adjustment process of the demodulation signal by the receiving end, the receiving end determines the phase relationship between the echo radiation and the demodulation signal, and adjusts the initial phase and/or pulse width of the demodulation signal according to the phase relationship until the demodulation signal meets the preset condition. Specifically, when the receiving end determines the phase relationship between the echo radiation and the demodulation signal, the receiving end may correlate the echo radiation with at least two sub-demodulation signals to obtain a correlation value, determine the phase relationship based on the correlation value. It should be noted that the embodiment of the present invention does not limit the use of other methods to determine the phase relationship between the echo radiation and the demodulation signal. Through the above implementation, the initial phase and pulse width of the demodulation signal are adjusted a plurality of times, which not only helps to determine the initial phase of echo radiation, so that the receiving end can determine the distance between the end and the object to be measured according to the initial phase of echo radiation. It also helps to improve the signal-to-noise ratio of the echo signals collected at the receiving end, avoid mutual interference between a plurality of distance measurement apparatus, and improve distance measurement accuracy.

When the demodulation signal includes at least two sub-demodulation signals that are adjacent in phase, the phase relationship includes but is not limited to the following: there is an overlap between the phase of the echo radiation and the phase of at least one of the at least two sub-demodulation signals; there is no overlap between the phase of the echo radiation and the phase of the at least two sub-demodulation signals.

Correspondingly, when adjusting the initial phase and pulse width of the demodulation signal according to the phase relationship, if there is an overlap between the phase of the echo radiation and the phase of at least one of the at least two sub-demodulation signals, in a possible implementation manner, the sub-demodulation signal with the most overlap with the echo radiation is selected from the at least one sub-demodulation signal. The initial phase of the demodulation signal is adjusted from the current initial phase of the demodulation signal to the initial phase of the selected sub-demodulation signal, and the pulse widths of at least two sub-demodulation signals are reduced by a preset pulse width adjustment value. In another possible implementation manner, from the at least one sub-demodulation signal, the sub-demodulation signal with the most overlap with the echo radiation is selected. The initial phase of the demodulation signal is adjusted from the current initial phase of the demodulation signal to the selected initial phase of the sub-demodulation signal, and the pulse widths of at least two sub-demodulation signals are reduced according to a preset pulse width adjustment ratio. Through the above two implementations, reducing the pulse width of the demodulation signal helps to improve the signal-to-noise ratio of the echo signal collected at the receiving end, avoids mutual interference between a plurality of distance measurement apparatus, and improves distance measurement accuracy.

Correspondingly, when adjusting the initial phase of the demodulation signal according to the phase relationship, if there is no overlap between the phase of the echo radiation and the phase of at least two sub-demodulation signals, then in a possible implementation manner, the initial phase of the demodulation signal is adjusted from the current initial phase of the demodulation signal to the current cut-off phase of the demodulation signal, and keep the pulse width of at least two sub-demodulation signals unchanged, so as to reduce the number of times of adjusting the initial phase and/or pulse width of the demodulation signal before reaching the preset condition, which shorten the time to reach the preset conditions and improve the efficiency of demodulation echo radiation.

S204: The receiving end determines the distance between the transmitting end and the object to be measured according to the overlapping portion and the current phase of the demodulation signal.

In S204, the initial phase of the echo radiation is determined based on the overlapping portion and the current phase of the demodulation signal, and the distance between the transmitting end and the object to be measured is determined according to the initial phase of the echo radiation.

When the overlapping portion includes the partial phase of one sub-demodulation signal and the entire phase of the other sub-demodulation signal in at least two sub-demodulation signals that are sequentially adjacent in phase, the phase difference between the partial phase of one sub-demodulation signal and the entire phase of the other sub-demodulation signal in the overlapping portion is determined. The initial phase of echo radiation is determined according to the phase difference and the current initial phase of the demodulation signal. When the overlapping portion only includes an entire phase of one sub-demodulation signal among at least two successively adjacent sub-demodulation signals, in a possible implementation manner, the initial phase of the echo radiation is determined based on entire phase of the sub-demodulation signal and the current initial phase of the demodulation signal. Optionally, the pulse width of each of the at least two sub-demodulation signals is the same.

In the embodiment of the present invention, the demodulation signal further includes at least one ambient light demodulation signal for receiving ambient light radiation. Before the step S204, the receiving end also removes the ambient light radiation included in the demodulation signal based on the at least one ambient light demodulation signal, so as to avoid interference of the ambient light signal on the demodulation process and improve the distance measurement accuracy. Optionally, the pulse width of the at least two sub-demodulation signals is the same as the pulse width of the ambient light demodulation signal corresponding to the at least two sub-demodulation signals, which helps to remove the ambient light signal included in the at least two sub-demodulation signals, and improves the effect of interference removal.

Optionally, the receiving end may also form at least one reset signal, and the phase of the at least one reset signal does not overlap with the phase of the demodulation signal.

Figure 4:
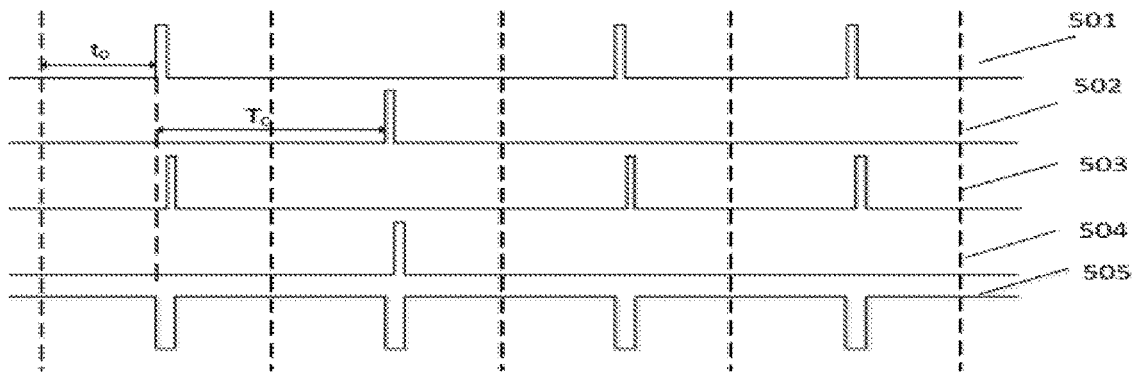
FIG. 4 schematically shows a diagram of modulating radiation timing provided by an embodiment of the present invention.

Taking the demodulation signal as a rectangular signal as an example, it is assumed that the rectangular signal includes two states of 0 and 1, respectively, and the demodulation signal is a demodulation signal group composed of 4 sub-demodulation signals 501 to 504. The number of demodulation signal groups is two. That is, the first demodulation signal group includes sub-demodulation signals 501 and 503 that are adjacent in phase, the second demodulation signal group includes sub-demodulation signals 502 and 504, and the second demodulation signal group is an ambient light demodulation signal. Step S201 to S204 are described with reference to FIGS. 4 to 12 as follows:

In S201, the transmitting end modulates the radiation 201 by using the modulating signal 101 to be triggered by the rising edge, and the radiation 201 and the modulating signal 101 can be simultaneously transmitted. The pulse width of the modulating signal 101 is Tc, and the pulse width of the emitted radiation 201 is T1. There is a certain phase relationship between the modulating signal 101 and the radiation 201. Specifically, in step S201, the modulating signal 101 sent by the transmitting end includes two demodulation signal groups and a reset signal 505. The first demodulation signal group includes a sub-demodulation signal 501 and a sub-demodulation signal 503, and the second demodulation signal group includes a sub-demodulation signal 502 and a sub-demodulation signal 504. As shown in FIG. 4, the transmitting end simultaneously transmits the sub-demodulation signal 501 and the modulating signal 101, and the pulse width of the sub-demodulation signals 501 to 504 is 400 ns at this time. The reset signal 505 is complementary to the sub-demodulation signals 501-504. The reset signal 505 takes 1 when the sub-demodulation signals 501 to 504 are 0, or the reset signal 505 takes 0 when the sub-demodulation signals 501 to 504 are 1.

After the radiation 201 is reflected by the object to be measured, the receiving end receives the echo radiation 401 in S202.

In S203, the receiving end adjusts the demodulation signal by cyclic phase shifting and reducing the pulse width of the demodulation signal a plurality of times, until there is an overlap between the phase of one of the two demodulation signal groups and the phase of echo radiation, and the pulse width of the demodulation signal group is reduced to the threshold (that is, the threshold is one-half).

Figure 5:
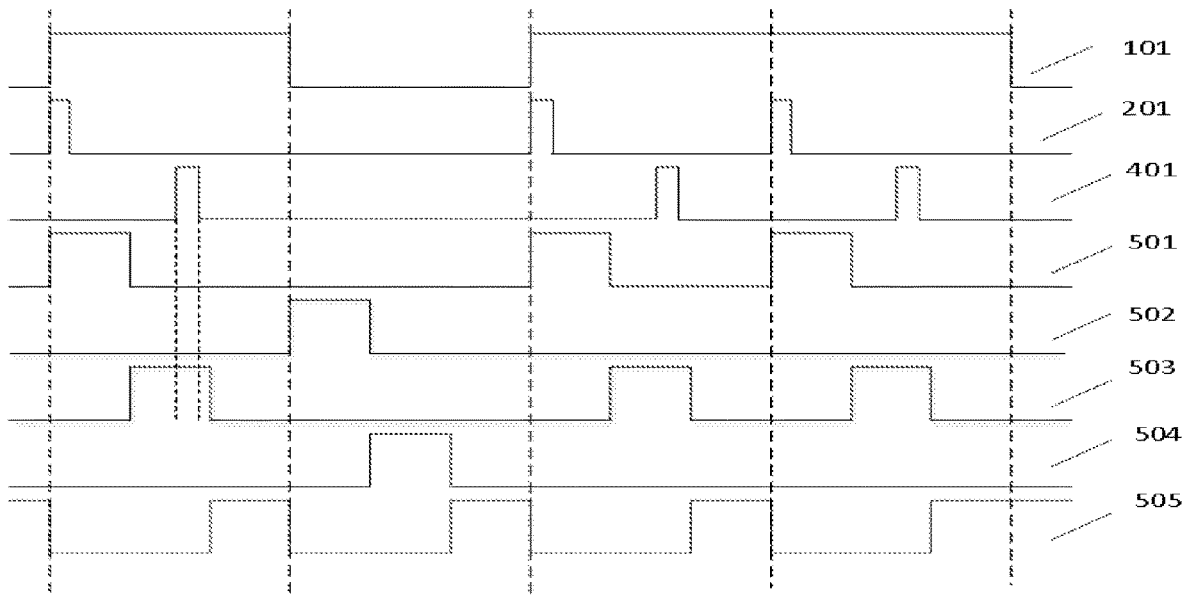
FIG. 5 schematically shows a diagram of a receiving end control timing according to an embodiment of the present invention.

It can be seen in FIG. 5 that the correlation value between the sub-demodulation signal 503 and the echo radiation 401 is the largest, and the correlation values of the remaining three sub-demodulation signals and the echo radiation 401 are all zero. At this time, the time between the rising edge of the sub-demodulation signal 503 and the starting phase of the modulating signal 101 is taken as the time delay Δt of the starting phase.

Figure 6:
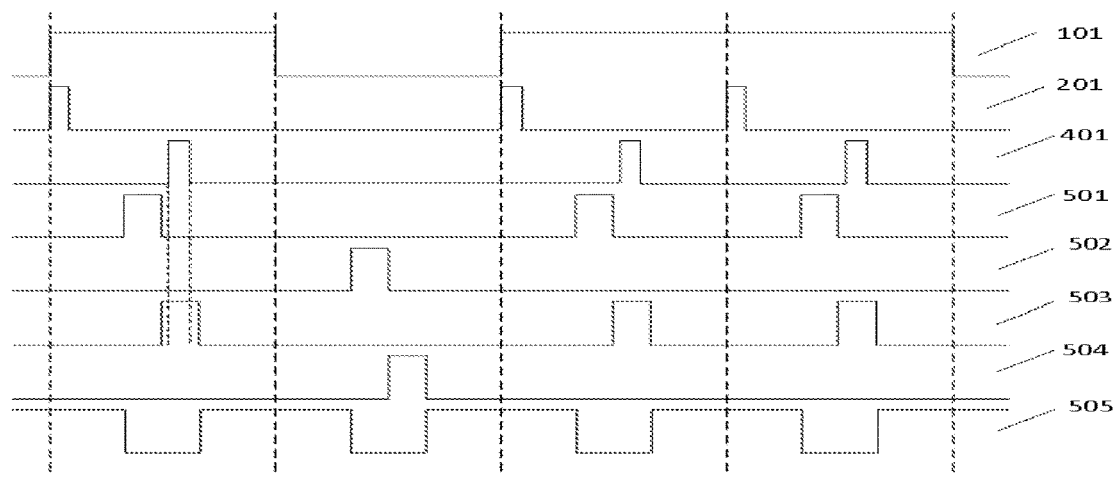
FIG. 6 schematically shows another diagram of receiving end control timing according to an embodiment of the present invention.
Figure 7:
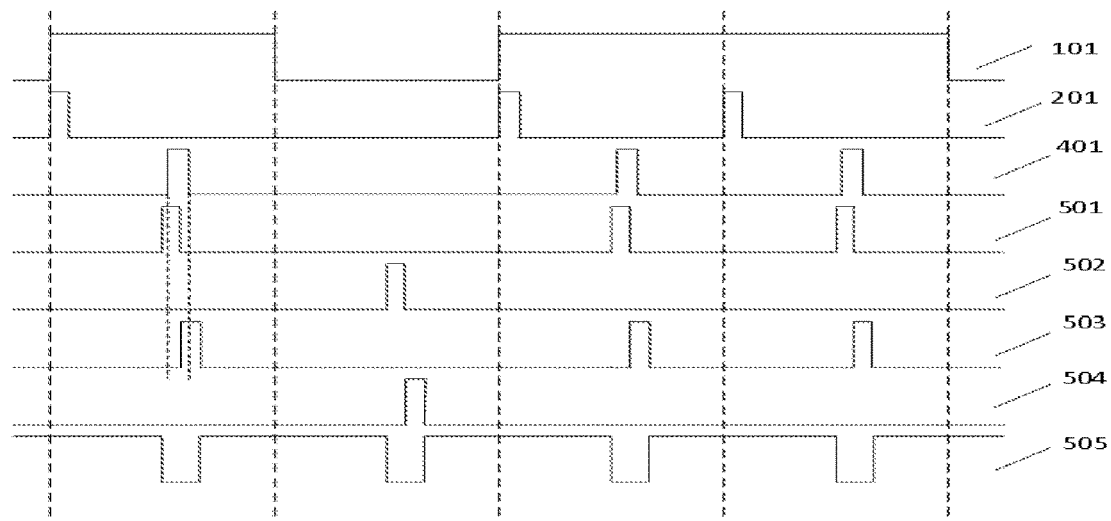
FIG. 7 schematically shows another diagram of receiving end control timing according to an embodiment of the present invention.

As shown in FIG. 6, the time delay Δt is taken as the phase shift of the sub-demodulation signals 501~504, and the pulse width of the sub-demodulation signals 501~504 is reduced to 200 ns. As shown in FIG. 7, the correlation value of the sub-demodulation signal 503 and the echo radiation 401 is still the largest. At this time, the time between the rising edge of the sub-demodulation signal 503 and the starting phase of the modulating signal 101 is continued to be used as the time delay Δt of the starting phase again.

As shown in FIG. 7, the modified time delay Δt is used as the phase shift of the sub-demodulation signals 501 to 504, and the pulse width of the sub-demodulation signals 501 to 504 is reduced to 100 ns. It can be seen from FIG. 8 that the correlation value obtained by correlating the sub-demodulation signal 501 and the echo radiation 401 at this time is the largest. Then, the time between the rising edge of the sub-demodulation signal 501 and the starting phase of the modulating signal 101 is taken as the time delay Δt of the starting phase.

Figure 8:
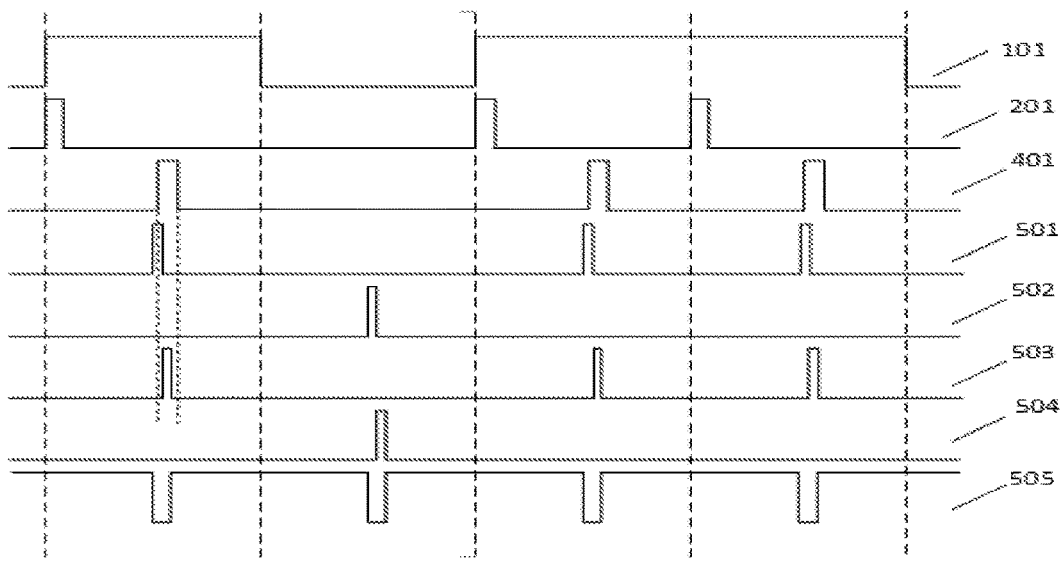
FIG. 8 schematically shows another diagram of receiving end control timing according to an embodiment of the present invention.

As shown in FIG. 8, the time delay Δt of the initial phase is taken as the phase shift of the sub-demodulation signals 501 to 504, and the pulse width of the sub-demodulation signals 501 to 504 is reduced to 50 ns. Since the pulse width of the emitted radiation 201 is 100 ns, the condition that the pulse width of the demodulation signal is one half of the pulse width of the emitted radiation is satisfied.

Figure 9:
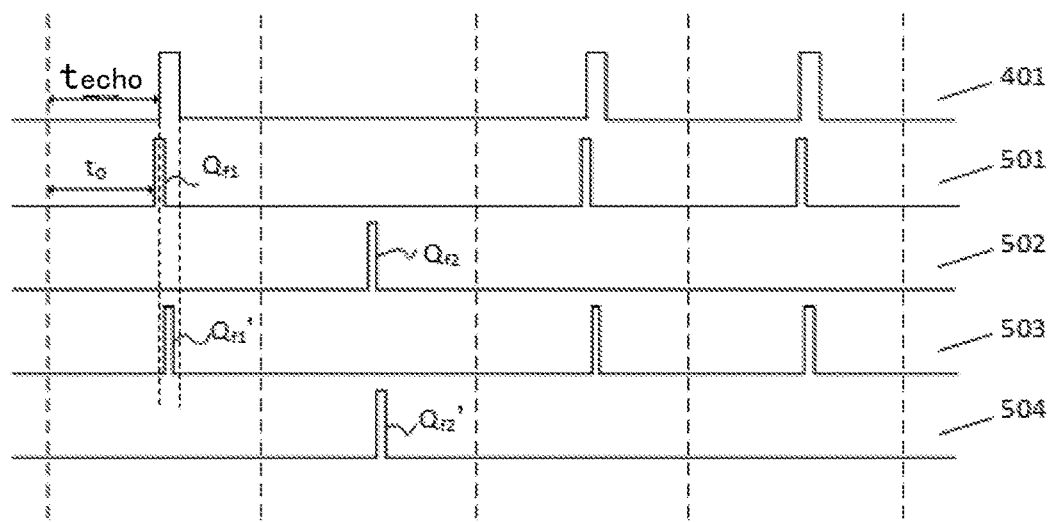
FIG. 9 schematically shows a diagram of a phase relationship between echo radiation and a demodulation signal according to an embodiment of the present invention.

Before S204, the receiving end obtains the corresponding correlation values $Q_{f1}$, $Q_{f2}$, $Q'_{f1}$ and $Q'_{f2}$ by correlating the four sub-demodulation signals 501 to 504 in the two demodulation signal groups with the echo radiation respectively. That is, as shown in FIG. 9, a sub-demodulation signal $Q_{f1}$ in the first demodulation signal group is subtracted from a sub-demodulation signal $Q_{f2}$ in the second demodulation signal group that phase-shifts the pulse width of the sub-demodulation signal to obtain the first difference correlation value $Q_0$. Another sub-demodulation signal $Q'_{f1}$ in the first demodulation signal group is subtracted from a demodulation signal $Q'_{f2}$ in the second demodulation signal group that phase-shifts the pulse width of the sub-demodulation signal to obtain a second difference correlation value $Q_1$. In this way, influencing factors such as ambient light that interfere with echo radiation are removed. The above calculation process can also be expressed as the following equations:

$Q_0 = Q_{f1} - Q_{f2}$ $Q_1 = Q'_{f1} - Q'_{f2}$

In S204, the initial phase of the echo radiation is determined based on the overlapping portion and the current phase of the demodulation signal, and the distance between the transmitting end and the object to be measured is determined according to the initial phase of the echo radiation.

In S204, the different magnitudes of the first difference correlation value $Q_0$ and the second difference correlation value are $Q_1$ used to determine the different phase relationship between the echo radiation and the demodulation signal. Thus, the distance d between the transmitter and the object to be measured can be obtained according to the first difference correlation value $Q_0$, the second difference correlation value $Q_1$, the current phase t0 of the demodulation signal and the current pulse width of the demodulation signal, in which x is a threshold set according to actual conditions, x is used to determine whether the receiving end receives echo radiation, and $T_2$=50 ns is the current pulse width of the demodulation signal.

FIGS. 9 to 12 show several phase relationships between echo radiation and demodulation signals.

As shown in FIG. 9, when the first difference correlation value $Q_0$ is less than the second difference correlation value $Q_1$, and the first difference correlation value $Q_0$ is greater than x, and the second difference correlation value is greater than x, then the overlap portion between the phase of the first demodulation signal group and the phase of the echo radiation is smaller than the overlap portion between the phase of the second demodulation signal group and the phase of the echo radiation. At this time, the phase shift $t_{echo}$ between echo radiation 401 and radiation 201 can be determined by the following equation, that is, the initial phase of echo radiation 401:

$$t_{echo} = t_0 + \frac{Q_0 - Q_1}{Q_0} \times T_2;$$

Figure 10:
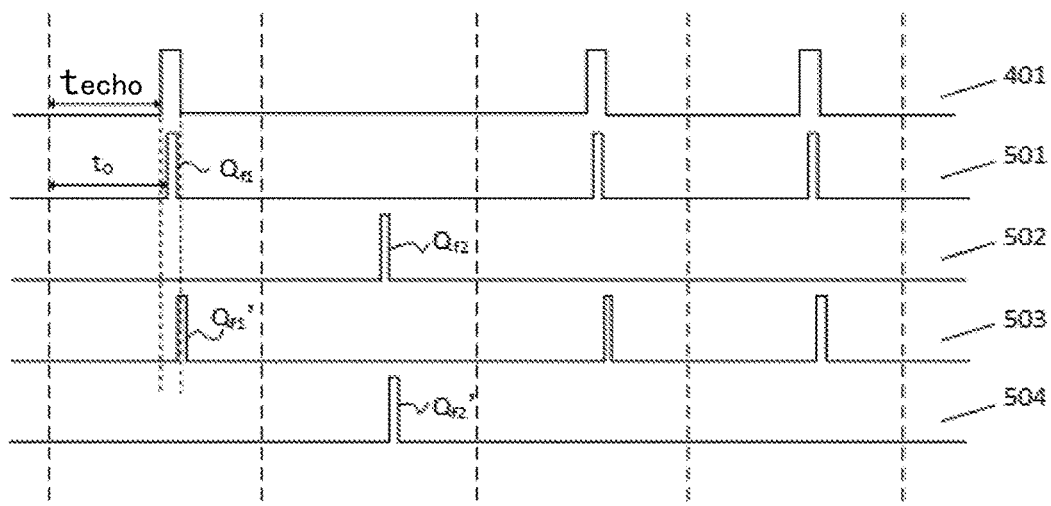
FIG. 10 schematically shows another diagram of the phase relationship between echo radiation and demodulation signal provided by an embodiment of the present invention.

As shown in FIG. 10, when the first difference correlation value $Q_0$ is greater than the second difference correlation value $Q_1$, and the first difference correlation value is greater than x, and the second difference correlation value $Q_1$ is greater than x, then the overlap portion between the phase of the first demodulation signal group and the phase of the echo radiation is larger than the overlap portion between the phase of the second demodulation signal group and the phase of the echo radiation. At this time, the phase shift $t_{echo}$ between echo radiation 401 and radiation 201 can be determined by the following equation, that is, the initial phase of echo radiation 401:

$$t_{echo} = t_0 - \frac{Q_0 - Q_1}{Q_0} \times T_2;$$

Figure 11:
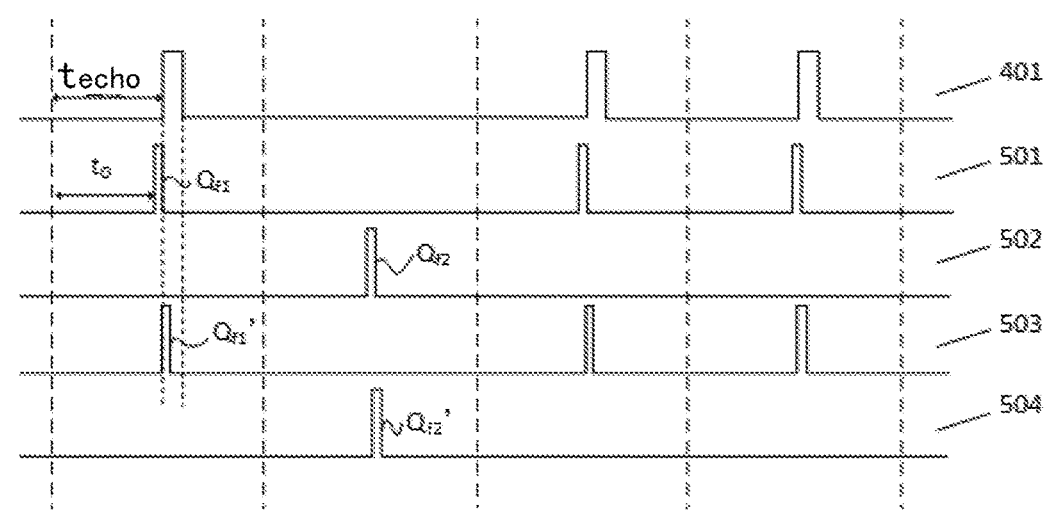
FIG. 11 schematically shows another diagram of the phase relationship between echo radiation and demodulation signal according to an embodiment of the present invention.

As shown in FIG. 11, when the first difference correlation value $Q_0$ is less than the second difference correlation value $Q_1$, and the first difference correlation value $Q_1$ is less than x, and the second difference correlation value $Q_1$ is greater than x, then there is no overlap between the phase of the first demodulation signal group and the phase of echo radiation, and there is an overlap between the phase of the second demodulation signal group and the phase of echo radiation. At this time, the phase shift $t_{echo}$ between wave radiation 401 and radiation 201 can be determined by the following e, that is, the initial phase of echo radiation 401

$t_{echo} = t_0 + T_2;$

Figure 12:
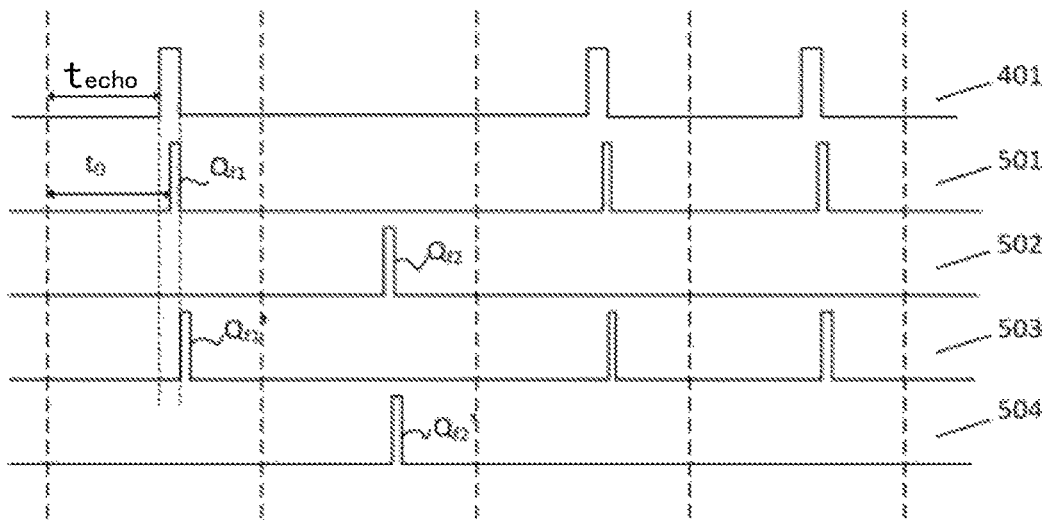
FIG. 12 schematically shows another diagram of the phase relationship between echo radiation and demodulation signal according to an embodiment of the present invention.

As shown in FIG. 12, when the first difference correlation value $Q_0$ is greater than the second difference correlation value $Q_1$, and the first difference correlation value $Q_0$ is greater than x, and the second difference correlation value $Q_1$ is less than x, then there is an overlap between the phase of the first demodulation signal group and the phase of the echo radiation, and there is no overlap between the phase of the second demodulation signal group and the phase of the echo radiation. At this time, the phase shift $t_{echo}$ between echo radiation 401 and radiation 201 can be determined by the following equation, that is, the initial phase of echo radiation 401:

$$t_{echo} = t_0 - T_2.$$

In S204, the distance d between the transmitting end and the object to be measured is calculated according to the initial phase (i.e. phase shift $t_{echo}$) of the echo radiation by the following equation, where c is the speed of light, namely $3 \times 10^8$ m/s $$d = \tfrac{1}{2} \times c \times t_{echo}.$$

In the method provided by the embodiment of the present invention, the receiving end adjusts the start position and pulse width of the demodulation signal at least once, until the demodulation signal meets the preset condition, then the distance between the transmitting end and the object to be measured is determined based on the overlapping portion and the current phase of the demodulation signal. The embodiment of the present invention obtains echo radiation by using a demodulation signal that meets preset conditions, which helps reduce the influence of noise and background light on the demodulation process of echo radiation, and improves the signal-to-noise ratio of the distance measurement system; by adjusting the initial phase of the demodulation signal also helps to improve the signal-to-noise ratio of the echo signal collected at the receiving end, avoiding mutual interference between a plurality of distance measurement apparatus, and improving distance measurement accuracy and distance measurement distance.

Figure 13:
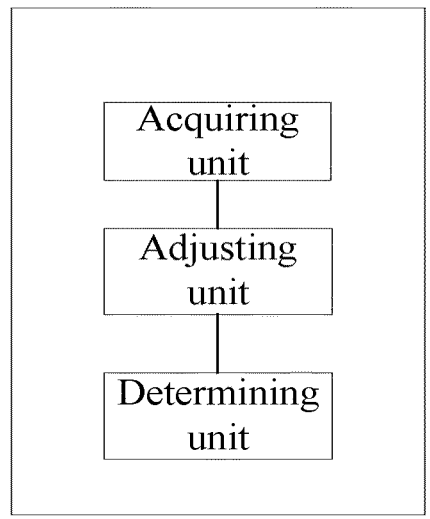
FIG. 13 schematically shows a schematic structural diagram of an apparatus according to an embodiment of the present invention.

After introducing a distance measurement method according to an exemplary implementation of the present invention, an apparatus for an exemplary implementation provided by the present invention is introduced. As shown in FIG. 13, the apparatus includes an acquiring unit, an adjusting unit and a determining unit, wherein:

the acquiring unit is used to acquire echo radiation, the echo radiation comes from the reflection effect of the object to be measured on the radiation, and the radiation is obtained by modulating the transmitting end with a modulating signal;

the adjusting unit is used to adjust the initial phase and/or pulse width of the demodulation signal used to demodulate the echo radiation at least once, until the demodulation signal meets the preset condition. The preset conditions is that there is an overlap between the phase of the demodulation signal and the phase of the echo radiation;

the determining unit is used to determine the distance between the transmitting end and the object to be measured according to the overlapping portion and the current phase of the demodulation signal.

Optionally, the preset condition further comprises that the pulse width of the demodulation signal meets a threshold, or the ratio between the pulse width of the demodulation signal and the pulse width of echo radiation meets a preset ratio.

Optionally, the adjusting unit is specifically used for: in the process of at least one adjustment of the demodulation signal, the process of each adjustment of the demodulation signal is as follows: determining the phase relationship between the echo radiation and the demodulation signal, and adjusting the initial phase and/or pulse width of the demodulation signal according to the phase relationship.

Optionally, the demodulation signal includes at least two sub-demodulation signals that are adjacent in phase, and the at least two sub-demodulation signals are used to receive echo radiation. When determining the phase relationship between the echo radiation and the demodulation signal, the adjusting unit is specifically used for: correlating the echo radiation with at least two sub-demodulation signals to obtain a correlation value; and determining the phase relationship according to the correlation value.

Optionally, the phase relationship includes one of the following: there is an overlap between the phase of the echo radiation and the phase of at least one of the at least two sub-demodulation signals; and there is no overlap between the phase of the echo radiation and the phase of the at least two sub-demodulation signals.

Optionally, when the adjusting unit adjusts the initial phase and pulse width of the demodulation signal according to the phase relationship, it is specifically used for: if there is an overlap between the phase of the echo radiation and the phase of at least one of the at least two sub-demodulation signals, the sub-solution with the most overlap with the echo radiation is selected from the at least one sub-demodulation signal; the starting phase of the demodulation signal is adjusted from the current starting phase of the demodulation signal to the starting phase of the selected sub-demodulation signal; and reducing the pulse widths of at least two sub-demodulation signals by a preset pulse width adjustment value, or reducing the pulse widths of at least two sub-demodulation signals according to a preset pulse width adjustment ratio.

Optionally, the adjusting unit adjusts the initial phase of the demodulation signal according to the phase relationship, specifically used for: if there is no overlap between the phase of the echo radiation and the phase of the at least two sub-demodulation signals, the starting phase of the demodulation signal is adjusted from the current starting phase of the demodulation signal to the current cut-off phase of the demodulation signal; and keep the pulse width of at least two sub-demodulation signals unchanged.

Optionally, the determining unit is specifically used for: the initial phase of echo radiation is determined based on the overlapped part and the current phase of the demodulation signal; determining the distance between the transmitter and the object to be measured according to the initial phase of the echo radiation.

Optionally, the overlapping portion includes a partial phase of one sub-demodulation signal and entire phase of the other sub-demodulation signal of at least two sub-demodulation signals that are adjacent in phase. When determining the initial phase of echo radiation based on the overlapping portion and the current phase of the demodulation signal, the determining unit is specifically used for: determining the phase difference between the partial phase of one sub-demodulation signal and the entire phase of the other sub-demodulation signal in the overlapping portion; determining initial phase of echo radiation according to the phase difference and the current initial phase of the demodulation signal.

Optionally, the overlapping portion only includes all phases of one sub-demodulation signal in at least two successively adjacent sub-demodulation signals. When the determining unit determines the starting phase of the echo radiation based on the overlapping portion and the current phase of the demodulation signal, it is specifically used to determine the initial phase of echo radiation based on all phases of the sub-demodulation signal and the current initial phase of the demodulation signal.

Optionally, the pulse width of each of the at least two sub-demodulation signals is the same. Optionally, the demodulation signal includes at least one ambient light demodulation signal for receiving ambient light radiation. Optionally, an interference removal unit is further included, which is used to remove the ambient light radiation included in the demodulation signal based on the at least one ambient light demodulation signal, before the determining unit determines the distance between the transmitting end and the object to be measured according to the overlapping portion and the current phase of the demodulation signal. Optionally, the pulse width of the at least two sub-demodulation signals is the same as the pulse width of the ambient light demodulation signal corresponding to the at least two sub-demodulation signals. Optionally, it further includes a reset unit for forming at least one reset signal, and the phase of the at least one reset signal does not overlap with the phase of the demodulation signal. Optionally, the preset pulse width adjustment ratio is 1/M, and M is a positive integer. Optionally, the demodulation signal is obtained by modulating a modulating signal, where the modulating signal includes a pseudo-random code.

Figure 14:
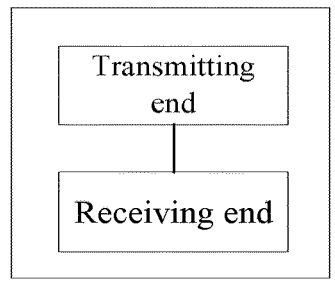
FIG. 14 schematically shows a structural diagram of a sensor according to an embodiment of the present invention.

The present invention provides an exemplary implementation of a sensor. Referring to FIG. 14, the sensor includes a transmitting end for modulating radiation using a preset modulating signal to send the radiation to an object to be measured; a receiving end for capturing echo radiation, which comes from the reflection of the radiation on the object to be measured; adjusting the initial phase and/or pulse width of the demodulation signal used to demodulate the echo radiation at least once until the demodulation signal meets the preset condition; the preset condition comprises that an overlapping portion exists between the phase of the demodulation signal and the phase of the echo radiation; determining the distance between the transmitting end and the object to be measured based on the overlap and echo radiation. The receiving end is used to execute any one of the methods provided in the embodiment corresponding to FIG. 2.

Figure 15:
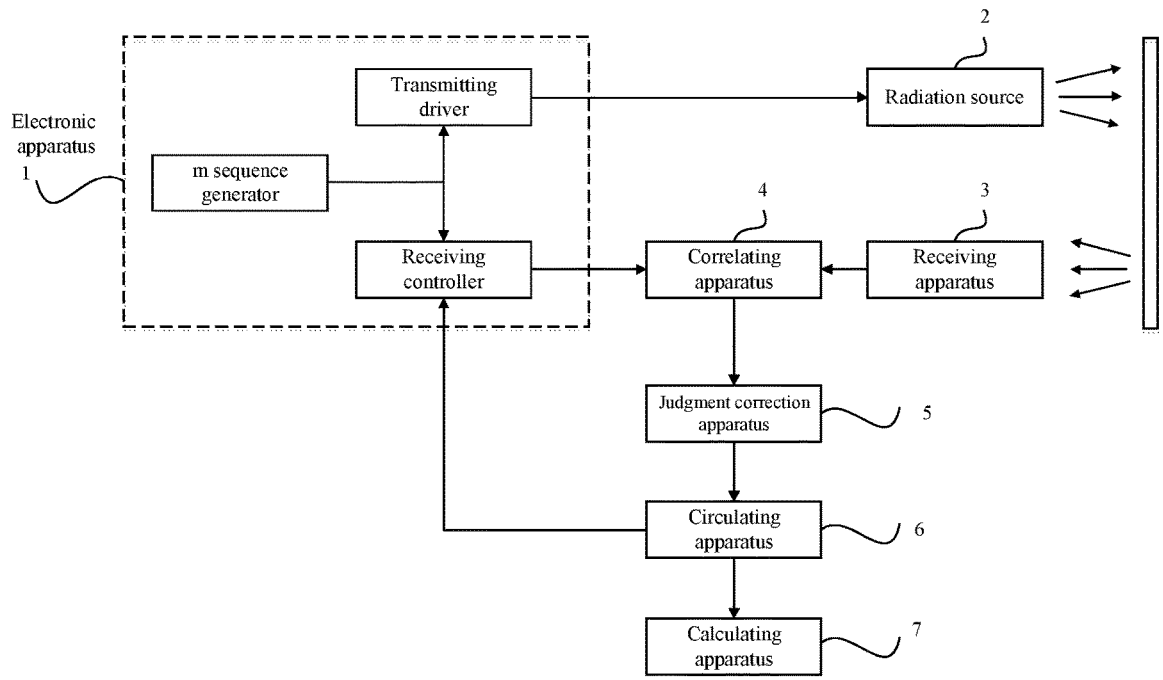
FIG. 15 schematically shows a schematic structural diagram of another sensor involved in an embodiment of the present invention.
Figure 16:
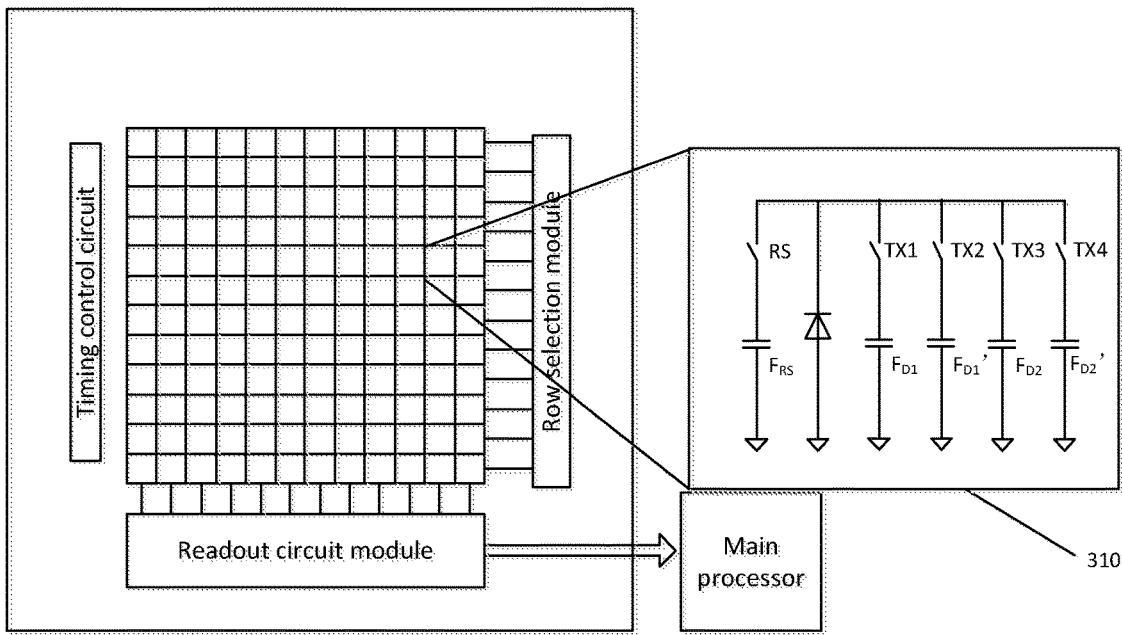
FIG. 16 schematically shows a structural diagram of a sensor array involved in an embodiment of the present invention.

The invention also provides an exemplary implementation of a sensor, referring to FIG. 15. In this embodiment, the transmitting end (i.e., the radiation source) is one laser or a plurality of lasers arranged. The transmitting end is modulated by an electronic apparatus 1, and the electronic apparatus 1 uses a pseudo-random code sequence as a modulating signal to operate the transmitting end 2 in a modulated manner. In this embodiment, the transmitting end 2 emits monochromatic IR light, which is diffusely reflected at the object and is incident on the receiving apparatus 3 as reflected radiation. In the receiving apparatus 3, the echo radiation produces a distribution of induced photo electrons. The judgment correction apparatus 5 is connected to the receiving apparatus 3 and obtains the time vs value distribution of the echo radiation intensity. According to the obtained time vs value distribution of the echo radiation intensity, the time difference between the rising edge of the corresponding demodulation signal with the largest value of the echo radiation intensity in the time vs value distribution and the transmission starting point of the modulating signal is selected as the time delay; delaying the transmission starting point of the demodulation signal by the same time delay, and reducing the current pulse width of the demodulation signal at the same time. In the circulating apparatus 6, the demodulation signal is circulated through a determining and correcting apparatus 5 and the transmission starting point of the demodulation signal is delayed. In addition, the pulse width of the demodulation signal should be reduced at the same time during each cycle until the current pulse width of the demodulation signal reaches the set threshold. If the threshold is greater than or equal to less than 1, the cycle ends. According to the correlating apparatus 4, a plurality of correlation values are obtained. In the calculating apparatus 7, the a plurality of correlation values are divided into two corresponding correlation values according to their phase relationship, and two difference correlation values are obtained by subtracting the corresponding two correlation values. Then, according to the magnitude relationship between the two difference correlation values, the distance between the TOF distance sensor in this embodiment and the object is calculated through a preset linear relationship. The electronic apparatus 1, the receiving apparatus 3, the correlating apparatus 4, the determining and correcting apparatus 5, the circulating apparatus 6, and the calculating apparatus 7 are integrated on a chip and implemented in a CMOS method. The chip and the transmitting end 2 are arranged on a support and surrounded by a housing. The transmitting end 2 and the receiving apparatus 3 respectively have optical apparatuses, which focus on the spatial direction in which the object distance is to be determined.

The present invention also provides an exemplary implementation of a sensor array, which includes a plurality of sensors. The a plurality of sensors may be the sensors of any one of the foregoing embodiments corresponding to FIG. 13 or FIG. 14. Alternatively, the plurality of sensors may also be a plurality of CMOS sensors similar to any one of the sensors in the embodiment corresponding to FIG. 13 or FIG. 14. The receiving end of the sensor is used to execute any one of the methods provided in the embodiment corresponding to FIG. 2.

Those skilled in the art should understand that the embodiments of the present invention may be provided as methods, systems, or computer program products. Therefore, the present invention may adopt the form of a complete hardware embodiment, a complete software embodiment, or an embodiment combining software and hardware. Moreover, the present invention may adopt the form of a computer program product implemented on one or more computer-usable storage media (including but not limited to disk storage, CD-ROM, optical storage, etc.) containing computer-usable program codes. The present invention is described with reference to flowcharts and/or block diagrams of methods, apparatuses (systems), and computer program products according to embodiments of the present invention. It should be understood that each process and/or block in the flowchart and/or block diagram, and the combination of processes and/or blocks in the flowchart and/or block diagram can be realized by computer program instructions. These computer program instructions can be provided to the processors of general-purpose computers, special-purpose computers, embedded processors, or other programmable data processing equipment to produce a machine. The instructions executed by the processor of the computer or other programmable data processing equipment are caused to generate means for implementing the functions specified in one or more processes in the flowchart and/or one block or more in the block diagram. These computer program instructions can also be stored in a computer-readable memory that can guide a computer or other programmable data processing equipment to work in a specific manner. The instructions stored in the computer-readable memory are caused to produce an article of manufacture including the instruction apparatus. The instruction apparatus realizes the functions specified in one process or a plurality of processes in the flowchart and/or one block or a plurality of blocks in the block diagram. These computer program instructions can also be loaded on a computer or other programmable data processing equipment, so that a series of operation steps are executed on the computer or other programmable equipment to produce computer-implemented processing. Thus, the instructions executed on the computer or other programmable apparatuses provide steps for implementing the functions specified in one or more processes in the flowchart and/or one block or more in the block diagram. Although the preferred embodiments of the present invention have been described, those skilled in the art can make additional changes and modifications to these embodiments once they learn the basic creative concept. Therefore, the appended claims are intended to be interpreted as including the preferred embodiments and all changes and modifications falling within the scope of the present invention. Obviously, those skilled in the art can make various changes and modifications to the embodiments of the present invention without departing from the spirit and scope of the embodiments of the present invention. In this way, if these modifications and variations of the embodiments of the present invention fall within the scope of the claims of the present invention and their equivalent technologies, the present invention also intends to include these modifications and variations.

What is claimed is:

1. A distance measurement method comprising:
   capturing echo radiation at a receiving end, the echo radiation coming from the reflection of radiation on an object to be measured, and the radiation modulated at a transmitting end by a modulating signal;
   adjusting the initial phase or pulse width of a demodulation signal at the receiving end used to demodulate the echo radiation at least once, until the demodulation signal meets a preset condition, wherein the preset condition comprises an overlapping portion between the phase of the demodulation signal and the phase of the echo radiation;
   determining a distance between the transmitting end and the object to be measured according to the overlapping portion and the current phase of the demodulation signal at the receiving end;
   said adjusting the initial phase or pulse width of a demodulation signal at the receiving end used to demodulate the echo radiation at least once further comprising:
      during the process of at least one adjustment of the initial phase or pulse width of the demodulation signal, wherein the process of each adjustment of the demodulation signal at the receiving end further comprises determining the phase relationship between the echo radiation and the demodulation signal, and adjusting the initial phase or pulse width of the demodulation signal according to the phase relationship.

2. The method according to claim 1, wherein the preset condition further comprises the pulse width of the demodulation signal meeting a threshold, or the ratio between the pulse width of the demodulation signal and the echo radiation satisfying a predetermined radiation ratio.

3. The method according to claim 1, wherein the demodulation signal comprises at least two sub-demodulation signals with adjacent phase, and the at least two sub-demodulation signals are used to receive the echo radiation;
   determining the phase relationship between the echo radiation and the demodulation signal further comprising:
      correlating the echo radiation with the at least two sub-demodulation signals to obtain a correlation value;
      determining the phase relationship according to the correlation value.

4. The method according to claim 1, wherein the phase relationship comprises one of the following:
   there being an overlap between the phase of the echo radiation and the phase of at least one of at least two sub-demodulation signals;
   there being no overlap between the phase of the echo radiation and the phase of the at least two sub-demodulation signals.

5. The method according to claim 4, adjusting the initial phase and pulse width of the demodulation signal according to the phase relationship further comprising:
   if there being an overlap between the phase of the echo radiation and the phase of at least one sub-demodulation signal of the at least two sub-demodulation signals, selecting the sub-demodulation signal with the most overlapping with the echo radiation from the at least one sub-demodulation signal;
   adjusting the initial phase of the demodulation signal from the current starting phase of the demodulation signal to the initial phase of the selected sub-demodulation signal; and
   reducing the pulse width of the at least two sub-demodulation signals by a preset pulse width adjustment value, or reducing the pulse width of the at least two sub-demodulation signals according to a preset pulse width adjustment ratio.

6. The method according to claim 4, adjusting the initial phase of the demodulation signal according to the phase relationship further comprising:
   if there being no overlap between the phase of the echo radiation and the phase of the at least two sub-demodulation signals, adjusting the initial phase of the demodulation signal from the current initial phase of the demodulation signal to the current cut-off phase of the demodulation signal; and
   keeping the pulse width of the at least two sub-demodulation signals unchanged.

7. The method according to claim 1, determining the distance between the transmitting end and the object to be measured according to the overlapping portion and the current phase of the demodulation signal by the receiving end further comprising:
   determining the initial phase of the echo radiation based on the overlapping portion and the current phase of the demodulation signal;
   determining the distance between the transmitting end and the object to be measured according to the initial phase of the echo radiation.

8. The method according to claim 7, wherein the overlapping portion includes a partial phase of one sub-demodulation signal and entire phase of the other sub-demodulation signal among at least two sub-demodulation signals with adjacent phase:
   determining the initial phase of the echo radiation based on the overlapping portion and the current phase of the demodulation signal further comprising:
   determining a phase difference between a partial phase of one sub-demodulation signal and entire phase of another sub-demodulation signal in the overlapping portion;
   determining the initial phase of the echo radiation according to the phase difference and the current initial phase of the demodulation signal.

9. A distance measuring apparatus comprising:
a transmitting end for modulating radiation with a preset modulating signal and sending the radiation to an object to be measured;
a receiving end for capturing echo radiation, coming from the reflection of the radiation on the object to be measured; adjusting the initial phase or pulse width of a demodulation signal used to demodulate the echo radiation at least once, until the demodulation signal meeting a preset condition, wherein the preset condition comprises an overlapping portion between the phase of the demodulation signal and the phase of the echo radiation; determining a distance between the transmitting end and the object to be measured according to the overlap and the echo radiation;
the receiving end configured to adjust the initial phase or pulse width of the demodulation signal used to demodulate the echo radiation at least once, wherein the process of each adjustment of the initial phase or pulse width of the demodulation signal comprises determining the phase relationship between the echo radiation and the demodulation signal, and adjusting the initial phase or pulse width of the demodulation signal according to the phase relationship.

10. An apparatus comprising:
a capturing unit, configured to capture echo radiation, the echo radiation coming from the reflection effect of an object to be measured on the radiation, and to obtain the radiation by modulating a signal generated in the transmitting end with a modulating signal;
an adjusting unit, configured to adjust the initial phase or pulse width of a demodulation signal used to demodulate the echo radiation at least once, until the demodulation signal meets a preset condition, wherein the preset condition comprises an overlapping portion between the phase of the demodulation signal and the phase of the echo radiation;
a determining unit, configured to determine a distance between the transmitting end and the object to be measured according to the overlapping portion and the current phase of the demodulation signal;
the adjusting unit specifically configured to adjust the initial phase or pulse width of the demodulation signal used to demodulate the echo radiation at least once, wherein the process of each adjustment of the initial phase or pulse width of the demodulation signal comprises determining the phase relationship between the echo radiation and the demodulation signal, and adjusting the initial phase or pulse width of the demodulation signal according to the phase relationship.

11. The apparatus according to claim 10, wherein the preset condition further comprises the pulse width of the demodulation signal meeting a threshold, or the ratio between the pulse width of the demodulation signal and the echo radiation satisfying a predetermined ratio.

12. The apparatus according to claim 10, wherein the demodulation signal comprises at least two sub-demodulation signals with adjacent phase, and the at least two sub-demodulation signals are used to receive the echo radiation;
to determine the phase relationship between the echo radiation and the demodulation signal, the adjusting unit specifically configured to:
correlate the echo radiation with the at least two sub-demodulation signals to obtain a correlation value;
determine the phase relationship according to the correlation value.

13. The apparatus according to claim 10, wherein the phase relationship comprises one of the following:
there being an overlap between the phase of the echo radiation and the phase of at least one of the at least two sub-demodulation signals;
there being no overlap between the phase of the echo radiation and the phase of the at least two sub-demodulation signals.

14. The apparatus according to claim 13, wherein when adjusting the initial phase and pulse width of the demodulation signal according to the phase relationship, the adjusting unit is specifically configured to:
select the sub-demodulation signal with the most overlap with the echo radiation from at least one sub-demodulation signal, if there being an overlap between the phase of the echo radiation and the phase of the at least one sub-demodulation signal of the at least two sub-demodulation signals;
adjust the initial phase of the demodulation signal from the current starting phase of the demodulation signal to the initial phase of the selected sub-demodulation signal; and
reduce the pulse width of the at least two sub-demodulation signals by a preset pulse width adjustment value, or reducing the pulse width of the at least two sub-demodulation signals according to a preset pulse width adjustment ratio.

15. The apparatus according to claim 13, wherein the adjusting unit adjusts the initial phase of the demodulation signal according to the phase relationship, specifically configured to:
adjust the initial phase of the demodulation signal from the current initial phase of the demodulation signal to a current cut-off phase of the demodulation signal, if there being no overlap between the phase of the echo radiation and the phase of the at least two sub-demodulation signals;
keep the pulse width of the at least two sub-demodulation signals unchanged.

16. The apparatus according to claim 10, wherein the determining unit is specifically configured to:
determine the initial phase of the echo radiation based on the overlapping portion and the current phase of the demodulation signal;
determine the distance between the transmitting end and the object to be measured according to the initial phase of the echo radiation.

17. The apparatus according to claim 16, wherein the overlapping portion includes a partial phase of one sub-demodulation signal and entire phase of the other sub-demodulation signal among at least two sub-demodulation signals adjacent in phase:
to determine the initial phase of the echo radiation based on the overlapping portion and the current phase of the demodulation signal, the determining unit specifically configured to:
determine a phase difference between a partial phase of one sub-demodulation signal and entire phase of another sub-demodulation signal in the overlapping portion;
determine the initial phase of the echo radiation according to the phase difference and the current initial phase of the demodulation signal.

\* \* \* \* \*